W. IRWIN.
SPRING.
APPLICATION FILED MAY 4, 1920.
1,385,919.
Patented July 26, 1921.
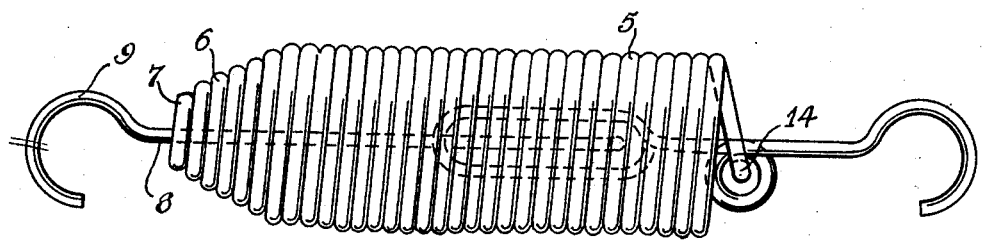
FIG. 1.
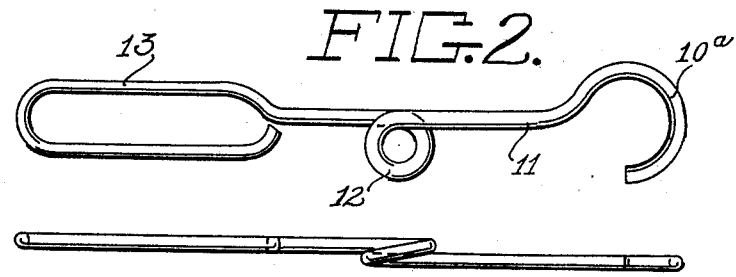
FIG. 2.
FIG. 3.
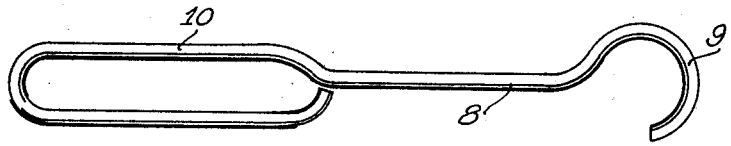
FIG. 4.
William Irwin,
INVENTOR.
BY
ATTORNEY.

UNITED STATES PATENT OFFICE.

WILLIAM IRWIN, OF IRWIN, PENNSYLVANIA.

SPRING.

1,385,919.  Specification of Letters Patent.  Patented July 26, 1921.

Application filed May 4, 1920. Serial No. 378,840.

*To all whom it may concern:*

Be it known that I, WILLIAM IRWIN, a citizen of the United States of America, and resident of Irwin, in the county of Westmoreland and State of Pennsylvania, have invented certain new and useful Improvements in Springs, of which the following is a specification.

This invention relates to springs and particularly to those employed in connection with the suspension of hammocks and the like and the said invention has for its object the provision of novel means whereby springs of this character may be rendered safe to prevent accidental falling of a swinging porch seat, swing or the like.

A further object of this invention is to provide a spring which will operate as a safety device to prevent falling of the load in the event of the fracture of a coil of the spring, the said spring affording the free yielding action usually present in springs of this character.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a view in elevation of a spring embodying the invention;

Fig. 2 illustrates a side elevation of a link and hook adapted to be associated with the spring;

Fig. 3 illustrates an edge view thereof; and

Fig. 4 illustrates a side elevation of a combined link and hook adapted to coact with the first mentioned hook and link and with the spring.

In these drawings 5 denotes a coiled spring of a type which is commonly employed for suspending porch seats, swings and the like, and the said spring in the present embodiment of the invention tapers at one end as shown at 6, and it terminates in an eye 7 through which the shank 8 of the hook 9 projects and which one end of the loop 10 contacts with when the spring is brought into action. The shank 8 of the hook has an eye or loop 10 which is elongated and extends longitudinally of the axis of the spring 5, and the said loop is embraced by the convolutions of the spring. The hook 10ª has a shank 11 with an eye 12 therein, the said eye being formed by bending the shank as shown in Fig. 3 and the end of the shank remote from the hook 10ª is formed into an elongated loop 13 which coacts with the loop 10 in that the said loop 13 extends longitudinally of the axis of the spring and the loops 10 and 13 interengage when the limit of outward movement of the spring is attained or if the spring becomes fractured.

One end of the spring has an extension 14 which projects through the eye 12 and may be suitably shaped to prevent its disengagement from the said eye and therefore when pull is exerted on the hooks 10ª, the spring will yield until the movement is attained which brings the ends of the loops 10 and 13 into engagement after which the weight will be sustained by the hooks alone, but ordinarily this would not occur unless the swing or support was overloaded to a degree which would likely impair the utility of the spring. However, should the spring become fractured, there would be such movement of the loops with relation to each other as to again bring the hooks in position to support the load so that the load would not fall.

I claim—

A spring construction including a body portion formed of a plurality of coils, the coils tapering toward one end and formed into an eye, and having an extension formed at the opposite end, a hook including a shank having an eye formed intermediate its ends, the last mentioned eye adapted to accommodate the extension, one end of the shank being positioned within the coils of the spring, a hook member disposed in the opposite end of the spring, said hook member having interlocking loops and one end of one of the loops adapted to contact with the inner tapered surface of the body portion to restrict movement of the hook member within the body.

WILLIAM IRWIN.